(12) United States Patent
Maldeney

(10) Patent No.: US 6,188,156 B1
(45) Date of Patent: Feb. 13, 2001

(54) CAST RABBET JOINT FOR PROPER ALIGNMENT OF ASSEMBLED COMPONENTS

(75) Inventor: Richard J. Maldeney, Florissant, MO (US)

(73) Assignee: Emerson Electric Co., St. Louis, MO (US)

(*) Notice: Under 35 U.S.C. 154(b), the term of this patent shall be extended for 0 days.

(21) Appl. No.: 09/431,453

(22) Filed: Nov. 1, 1999

(51) Int. Cl.$^7$ .................................................. H02K 5/00
(52) U.S. Cl. .............................. 310/89; 370/88; 370/91; 29/596
(58) Field of Search .................... 310/89, 91, 88; 29/596, 598

(56) References Cited

U.S. PATENT DOCUMENTS

| 4,644,204 | * | 2/1987 | Lakin ........................ 310/89 |
| 4,827,167 | * | 5/1989 | Mayumi et al. .............. 310/89 |
| 6,018,206 | * | 1/2000 | Corbett et al. .............. 310/91 |

* cited by examiner

Primary Examiner—Nestor Ramirez
Assistant Examiner—Thanh Lam
(74) Attorney, Agent, or Firm—Howell & Haferkamp, LC

(57) ABSTRACT

A rabbet joint between two components of an assembly eliminates the possibility of the formation of an undesirable radius between angled surfaces of the rabbet by segmenting the surfaces with recesses in an alternating pattern, thus forming the rabbet surfaces without sharp edges while still providing a sharp unobstructed inside-angle between the surfaces of the rabbet.

21 Claims, 2 Drawing Sheets

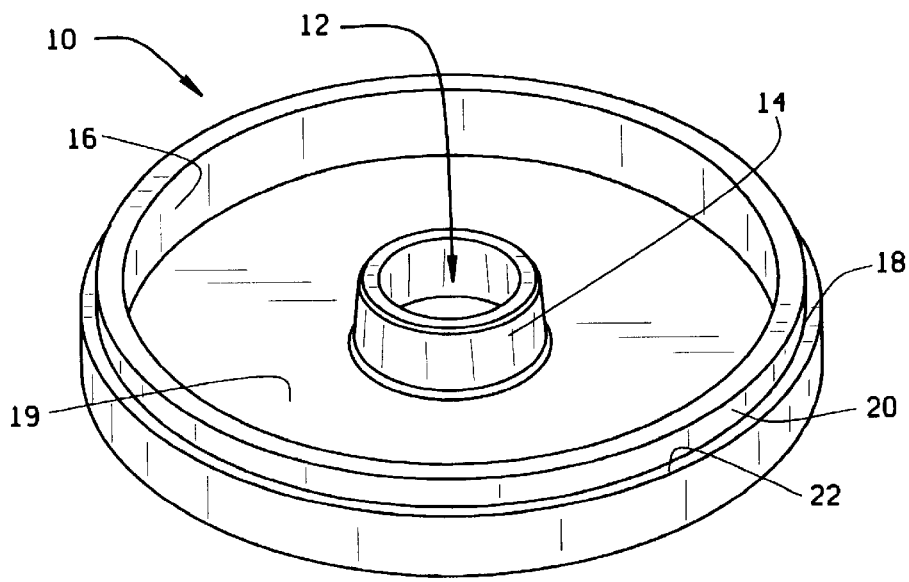
FIG. 1
PRIOR ART
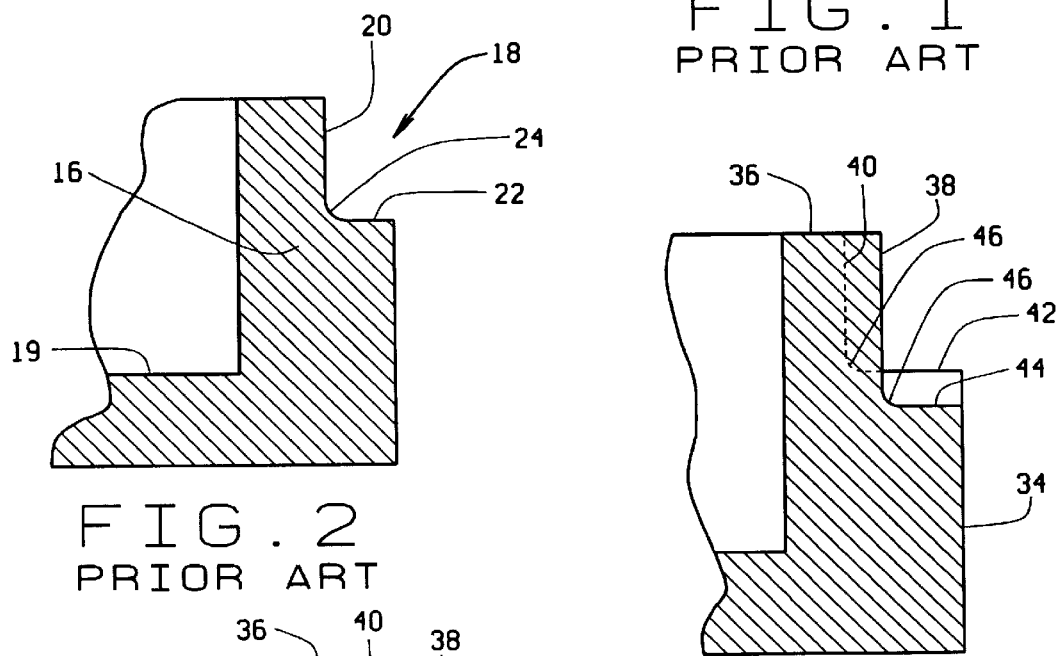
FIG. 2
PRIOR ART
FIG. 5
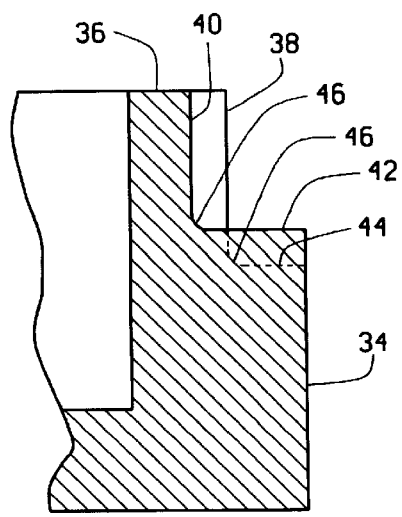
FIG. 6

CAST RABBET JOINT FOR PROPER ALIGNMENT OF ASSEMBLED COMPONENTS

BACKGROUND OF THE INVENTION (1) Field of the Invention

The present invention pertains to a rabbet joint between two component parts and a method of forming a rabbet joint. More particularly, the present invention pertains to an apparatus and method for eliminating the radius commonly formed between the faces of an annular rabbet.

(2) Description of the Related Art

When joining components of an assembly, a rabbet is often useful on at least one of the components to provide a plurality of engagement surfaces between mating components of the assembly. In addition to providing structural support, rabbets also facilitate proper alignment of the components with respect to each other.

Typically, a rabbet takes the form of a right-angle groove or channel made into the edge of a component part that is adapted to receive and engage the corner of a mating component. As an example, rabbets are used to facilitate the assembly of components in dynamoelectric devices. Dynamoelectric devices are commonly comprised of, a rotor and shaft assembly, a stator encircling the rotor and shaft assembly, a cylindrical shell housing secured to and encircling the stator, and a pair of end shields secured to the ends of the housing. Because the end shields typically support bearings mounted on the rotor and shaft assembly and thereby position the rotor and shaft assembly relative to the stator, proper alignment of the end shields with respect to the housing can be critical to the operation of the dynamoelectric device. It is therefore common to provide a rabbet around the edge of the end shield to ensure that proper alignment with the housing is made.

A prior art end shield is shown in FIG. 1. The end shield 10 has a hole 12 that allows a shaft of a dynamoelectric device to pass therethrough. An annular boss 14 extends around the hole 12 and is adapted to support a bearing mounted on the shaft. The end shield 10 also has a cylindrical rim 16 protruding from the perimeter of its main body and has a rabbet 18 formed thereon. Although end shields similar to the end shield 10 shown are common in the industry, many variations exist. For example, in FIG. 1 the end shield 10 is shown having a solid web 19 extending from the boss 14 to the rim 16. However, it is also common to have a plurality of spokes extending radially from the boss 14 to the rim 16 with ventilation openings therebetween in place of the solid web 19. Similarly, it is not necessary for an end shield to have a hole 12 for passage of the shaft therethrough, nor that the rim 16 extend axially from the main body. It is an improvement to the prior art annular rabbet 18 that is a focus of this invention.

The particular prior art rabbet 18 is formed on the rim 16 of the end shield 10. The rabbet 18 is comprised of a cylindrical surface 20 and an adjacent, perpendicular annular surface 22. The two surfaces form a right-angle shoulder around the rim 16 adapted to engage an end of a cylindrical shell housing of the dynamoelectric device. The diameter of the cylindrical surface 20 is approximately equal to that of a cylindrical interior surface of the housing nearest the housing end. Thus when the end shield 10 is assembled onto the housing, the cylindrical surface 20 engages the interior surface, thereby radially positioning and supporting the end shield 10 relative to the housing. Similarly, the annular surface 22 is designed to axially position the end shield 10 relative to the housing by engaging an annular end surface of the housing that is perpendicular to the interior surface of the housing. Once in proper alignment, the components may be further secured to each other by fasteners, adhesives, interlocking tabs or catches, or by other means for securing together components of an assembly as known to those skilled in the art.

As shown in the detailed cross-section of the prior art rabbet 18 in FIG. 2, a radius 24 is often inadvertently formed between the annular surface 22 and the cylindrical surface 20. This radius 24 can be the result of cutting tool wear when a machining process is used to form the rabbet 18 on the end shield 10. Additionally, the radius 24 may be the result of wear of the dies or molds used to cast or mold the end shields 10. When precise alignment of the components within an assembly is required, any radius 24 formed between the annular surface 22 and the cylindrical surface 20 is undesirable in that, the radius 24 may prevent the annular surface 22 from engaging its mating component resulting in improper axial alignment of the components and the undesirable appearance of a gap between the end shield 10 and the shell housing.

Prior art solutions to this problem include reworking the end shield 10 by machining the rabbet 18 using sharp cutting tools to reduce the radius 24. The extra machining process required by this solution greatly adds to the expense of production. Since the preferred method of fabrication is to mold or cast the end shields 10, another solution has been to periodically rework or replace the molds or dies. This solution unnecessarily burdens the production process when the molds and dies are otherwise adequate. Yet another solution is to provide a chamfer or radius on the housing between the interior surface and the annular end surface of the housing that is larger than that of the radius 24, thus providing relief in the housing for the radius 24 when the components are properly aligned. Like the other solutions, modifying the housing increases the cost of production and it is therefore desirable to find alternative solutions to the problem that can eliminate the radius 24 without adding a process step or otherwise increasing the cost of production.

The present invention overcomes the problems associated with prior art rabbet joints by utilizing a plurality of separated coplanar surfaces in place of the prior art annular surface 22 and by positioning a plurality of cylindrical surface segments perpendicular to and between the coplanar surfaces. The aggregate of the cylindrical surface segments replaces the cylindrical surface 20 of the prior art rabbet 18. In accordance with this invention, no common edge is formed between the coplanar surfaces and adjacent cylindrical surface segments and, therefore, no radius 24 can be formed regardless of die, mold, or tool wear during the manufacturing process. This invention allows a component, such as an end shield, to be molded or cast with an annular rabbet type fitting and to align perfectly when assembled to a sharp edged mating component, regardless of minor die or mold wear.

SUMMARY OF THE INVENTION

The annular rabbet of the present invention replaces the prior art annular rabbet on an end shield. In accordance with the present invention, an end shield is formed with a plurality of cylindrical surface segments that are spaced circumferentially about a common axis by recesses in the end shield. Perpendicular and adjacent to the cylindrical surfaces are a plurality of spaced, coplanar surfaces with recesses therebetween. The coplanar surfaces are positioned circumferentially about the common axis between the cylindrical surface segments. The cylindrical surface segments and the coplanar surfaces are adapted to engage with an end of the cylindrical shell housing. The configuration of the cylindrical surface segments and the coplanar surfaces eliminates the mutual edge or corner formed between the cylindrical surface and the annular surface on prior art end shield rabbets. By eliminating such an edge on the present invention, an undesirable radius cannot be formed thereon.

In another aspect of the invention, a method of forming a rabbet joint between two component parts of an assembly comprises the steps of forming a plurality of cylindrical surface segments on a first component with the cylindrical surface segments being separated circumferentially about a common axis by recesses formed into the first component, forming a plurality of coplanar surfaces into the first component that are separated by recesses and are perpendicular to and between the cylindrical surface segments, and engaging the first component with the second component of the assembly.

While the principle advantages and features of the present invention have been described above, a more complete and thorough understanding of the invention may be attained by referring to the drawings and detailed description of the preferred embodiments, which follow.

BRIEF DESCRIPTION OF THE DRAWINGS

FIG. 1 is an isometric view of a prior art end shield of a dynamoelectric device having a rabbet thereon.

FIG. 2 is a partial cross-section of the prior art end shield rabbet of FIG. 1.

FIG. 5 is a partial cross-section of the end shield of FIG. 3 taken in the plane of line 5—5.

FIG. 6 is a partial cross-section of the end shield of FIG. 3 taken in the plane of line 6—6.

Reference characters in the written specification indicate corresponding parts throughout the several views of the drawings.

DETAILED DESCRIPTION OF THE INVENTION

Figure 3:
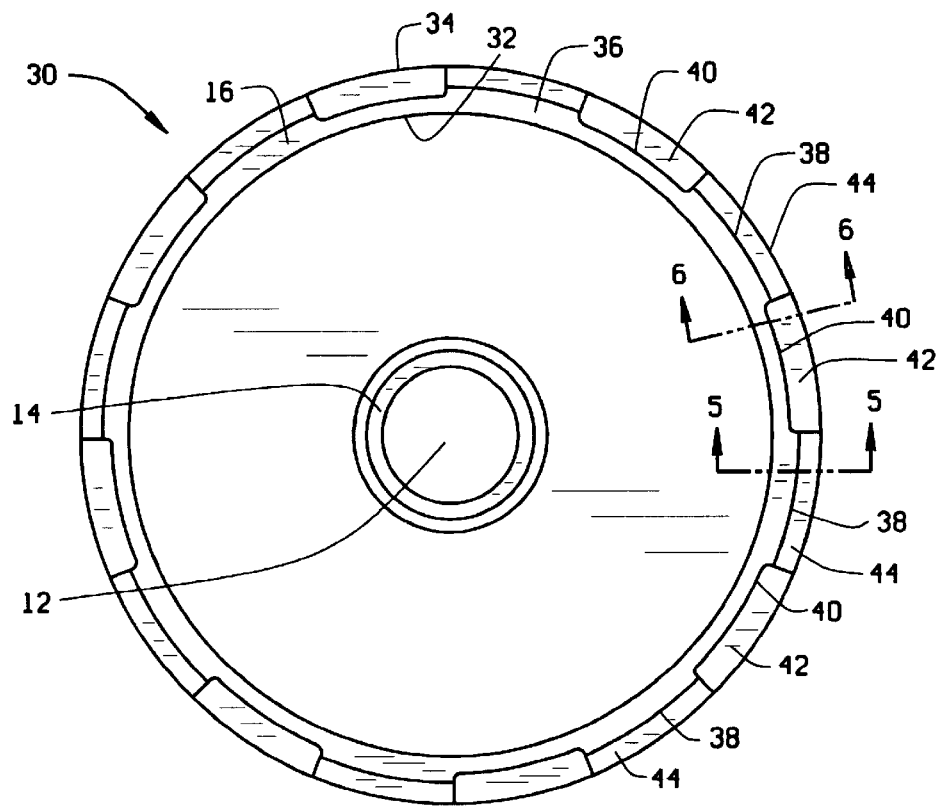
FIG. 3 is a plan view of an end shield utilizing a rabbet of the preferred embodiment of the invention.

The preferred embodiment of the annular rabbet of the invention is used in conjunction with the end shield of a dynamoelectric device as shown in FIG. 3. The end shield 30, like the prior art end shield 10, has a center hole 12 surrounded by a cylindrical boss 14 and a peripheral rim 16. In the preferred embodiment, the rim 16 is cylindrical and has an inner surface 32 and a concentric outer surface 34 that extend axially from the main body of the end shield 30 and terminate at a perpendicular annular end surface 36.

Figure 4:
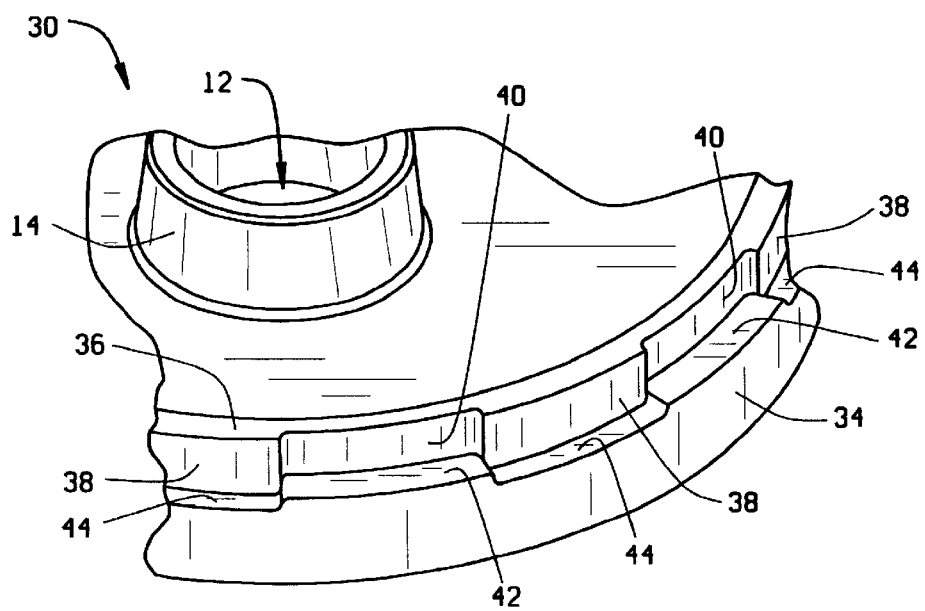
FIG. 4 is a partial isometric view of the end shield of FIG. 3.

In the annular rabbet of the invention, as shown with greater detail in FIG. 4, a plurality of concentric cylindrical surface segments 38 are radially recessed into the rim 16 and are circumferentially spaced around the periphery of the rim 16. The cylindrical surface segments 38 have the same radius of curvature and are circumferentially separated about their common axis by radial recesses 40 therebetween. Perpendicular to the cylindrical surface segments 38 are a plurality of arced coplanar surfaces 42 that extend radially into the rim 16 and are circumferentially spaced around the periphery of the rim 16. The coplanar surfaces 42 are separated circumferentially about the common axis by axial recesses 44 and are positioned circumferentially between the cylindrical surface segments 38. The cylindrical surface segments 38 of the preferred embodiment extend axially from the annular end surface 36 of the rim 16 and terminate at the recesses 44 that separate the coplanar surfaces 42. Similarly, the coplanar surfaces extend radially inwards from the outer surface 34 of the rim 16 and terminate at the recesses 40 that separate the cylindrical surface segments 38. The cylindrical surface segments 38, like the prior art end shield cylindrical surface 20, are dimensioned to engage the interior surface of a mating member such as the cylindrical shell housing, while the coplanar surfaces 42, like the prior art annular surface 22, are adapted to engage the annular end surface of the mating member.

The alternating positioning of the coplanar surfaces 42 circumferentially between the cylindrical surface segments 38 eliminates the possibility of the formation of a radius therebetween. The result is an unobstructed right-angle formed between the coplanar surfaces 42 and the cylindrical surface segments 38 as shown in the partial cross-sections of the preferred embodiment in FIGS. 5 and 6. Thus, although tool, die, or mold wear during production of components may result in variations of radii 46 between the cylindrical surface segments 38 and the recesses 44 and variations of radii 46 between the coplanar surfaces 42 and the recesses 40, the radii 46 will not interfere with the engagement and desired relative positioning of the end shield 30 with the cylindrical shell housing of the dynamoelectric device.

It is important to understand that, although the preferred embodiment is shown with cylindrical surface segments 38 facing radially outward and the coplanar surfaces 42 extending radially inward from the outer surface 34 of the rim 16, the cylindrical surface segments 38 could face radially inwards with the coplanar surfaces extending radially outwards from the inner surface 32 of the rim 16. In such a situation, the cylindrical surface segments 38 would be adapted to engage an outer, rather than inner cylindrical surface of the mating component. Additionally, neither the inner surface 32 nor the outer surface 34 of the rim 16 need be cylindrical. The two surfaces could be formed along a straight edge of one component that meets with a straight edge of a second component. Furthermore, the cylindrical surface segments 38 and the coplanar surfaces 42 could be formed directly on the perimeter of the end shield 30 regardless of the presence of the rim 16.

In accordance with the invention, a preferred method of forming a rabbet joint between a first component, for example an end shield, and a second component, for example a cylindrical shell housing, comprises the steps of, forming a plurality of cylindrical surface segments 38 on the first component separated circumferentially about their common axis by recesses 40, forming a plurality of coplanar surfaces 42 separated by recesses 44 and annularly positioned perpendicular to and circumferentially between the cylindrical surface segments 38, and engaging the first component with the second component. The steps of forming the coplanar surfaces 42 and the cylindrical surface segments 38 can be performed by molding, casting, machining, or by any method known by those skilled in the art. In the preferred embodiment the surfaces are cast. When engaging the components, the cylindrical surface segments 38 engage the cylindrical surface of the second component as the end shield 30 is moved axially onto the second component. The engagement of the cylindrical surface segments 38 with the cylindrical surface of the second components prevents radial movement of the first component relative to the second component. Final engagement occurs when the coplanar surfaces 42 engage with the second component to limit axial movement. In the preferred embodiment, the method is utilized with the first component being the end shield of a dynamoelectric device and the second component being the housing of the device.

While the present invention has been described by reference to specific embodiments, it should be understood that modifications and variations of the invention may be constructed without departing from the scope of the invention defined in the following claims.

What is claimed:

1. A joint in an assembly comprising:

a first component having an end surface and a side surface that intersect to form an edge of the first component;

a second component having a plurality of first surface segments that are separated from each other by a first set of recesses and a plurality of second surface segments that are separated from each other by a second set of recesses, the second surface segments are oriented at an angle relative to the first surface segments and are adjacent the first set of recesses, and the first surface segments engage with the side surface of the first component and the second surface segments engage with the end surface of the first component thereby forming the joint between the first and second components.

2. The joint of claim 1, wherein:

the first and second surface segments are relatively positioned in an alternating arrangement on the second component.

3. The joint of claim 2, wherein:

the first and second surface segments are relatively positioned at a right angle to each other.

4. A joint for connection to a cylindrical housing having an end surface and a side surface adjacent the end surface, the joint comprising;

a circular main body having a peripheral rim and a center axis;

at least two cylindrical surface segments having an equal radius of curvature are formed on the rim, the cylindrical surface segments being separated circumferentially around the center axis by radial recesses therebetween, the cylindrical surface segments also being adapted to engage the side surface of the cylindrical housing when the mainbody is joined to the housing;

at least two coplanar surfaces are formed on the rim, the coplanar surfaces being separated circumferentially around the center axis by axial recesses therebetween, the coplanar surfaces also being positioned circumferentially between the cylindrical surface segments and being adapted to engage the end surface of the housing when the mainbody is joined to the housing.

5. The joint of claim 4, wherein:

the cylindrical surface segments face radially outward and the side surface of the housing is an interior cylindrical surface.

6. The joint of claim 4, wherein:

the coplanar surfaces and the cylindrical surface segments are equal in number.

7. The joint of claim 6, wherein:

each two adjacent coplanar surfaces are separated by one cylindrical surface segment.

8. The joint of claim 4, wherein:

the coplanar surfaces have equal surface areas.

9. The joint of claim 4, wherein:

the coplanar surfaces define a plane that intersects the at least two cylindrical surface segments and the at least two cylindrical surface segments define a cylinder that intersects the at least two coplanar surfaces.

10. The joint of claim 9, wherein:

the main body is the end shield of a dynamoelectric device.

11. The joint of claim 4, wherein:

the peripheral rim protrudes axially from the main body.

12. An enclosure for a dynamoelectric device comprising:

a cylindrical housing, the housing having an end surface and a side surface adjacent the end surface; and an end shield having a main body with a peripheral rim and a center axis, the rim having at least two cylindrical surface segments formed thereon, the cylindrical surface segments having an equal radius of curvature and being separated circumferentially around the center axis by radial recesses therebetween, the cylindrical surface segments also engaging the side surface of the housing when the end shield is joined to the housing, the rim also having at least two coplanar surfaces formed thereon, the coplanar surfaces being separated circumferentially about the center axis by axial recesses therebetween, the coplanar surfaces being positioned circumferentially between the cylindrical surface segments and the coplanar surfaces engaging the end surface of the housing when the end shield is joined to the housing.

13. The enclosure of claim 12 wherein;

the cylindrical surface segments face radially outwards and the side surface of the housing is an interior cylindrical surface.

14. The enclosure of claim 12 wherein;

the coplanar surfaces and the cylindrical surface segments are equal in number.

15. The enclosure of claim 12 wherein;

each two adjacent coplanar surfaces are separated by one cylindrical surface segment.

16. The enclosure of claim 12 wherein;

the coplanar surfaces define a plane that intersects the at least two cylindrical surface segments and the at least two cylindrical surface segments define a cylinder that intersects the at least two coplanar surfaces.

17. The enclosure claim 12 wherein;

a peripheral rim having a radially inner surface and a radially outer surface protrudes axially from the end shield, the cylindrical surface segments are positioned between the inner and outer surfaces of the rim and the coplanar surfaces extending radially inwards from the outer surface.

18. A method of forming a rabbet joint for connecting a first component of an assembly to a second component of the assembly, the method comprising;

forming at least two concentric cylindrical surface segments on the first component with the cylindrical surface segments having a common axis and an equal radius of curvature, separating the cylindrical surface segments circumferentially about the common axis by radial recesses therebetween, and positioning the cylindrical surface segments to engage a cylindrical mating surface of the second component;

forming at least two coplanar surfaces on the first component with the coplanar surfaces being perpendicular to the common axis and facing in an axial direction, separating the coplanar surfaces circumferentially about the axis by axial recesses therebetween, and positioning the coplanar surfaces circumferentially between the cylindrical surface segments and where they will engage with an annular mating surface of the second component; and engaging the components by axially moving the first component relative to the second component with the cylindrical surface segments engaging the cylindrical mating surface of the second component until the coplanar surfaces engage the annular surface of the second component.

19. The method of claim 18 further comprising:

forming the first component as an end shield of a dynamo-electric device and forming the second component as a cylindrical shell housing of the device.

20. The method of claim 19 further comprising:

forming the cylindrical surface segments facing radially outwards to engage with an interior surface of the cylindrical mating surface of the second component.

21. The method of claim 19 wherein:

forming the end shield with an annular rim protruding axially therefrom and with the cylindrical surface segments and the coplanar surfaces formed on the rim.

* * * * *